Oct. 30, 1945.    R. W. McBRIEN    2,387,922
APPARATUS FOR MEASURING LIQUIDS
Filed Nov. 23, 1942    3 Sheets-Sheet 1
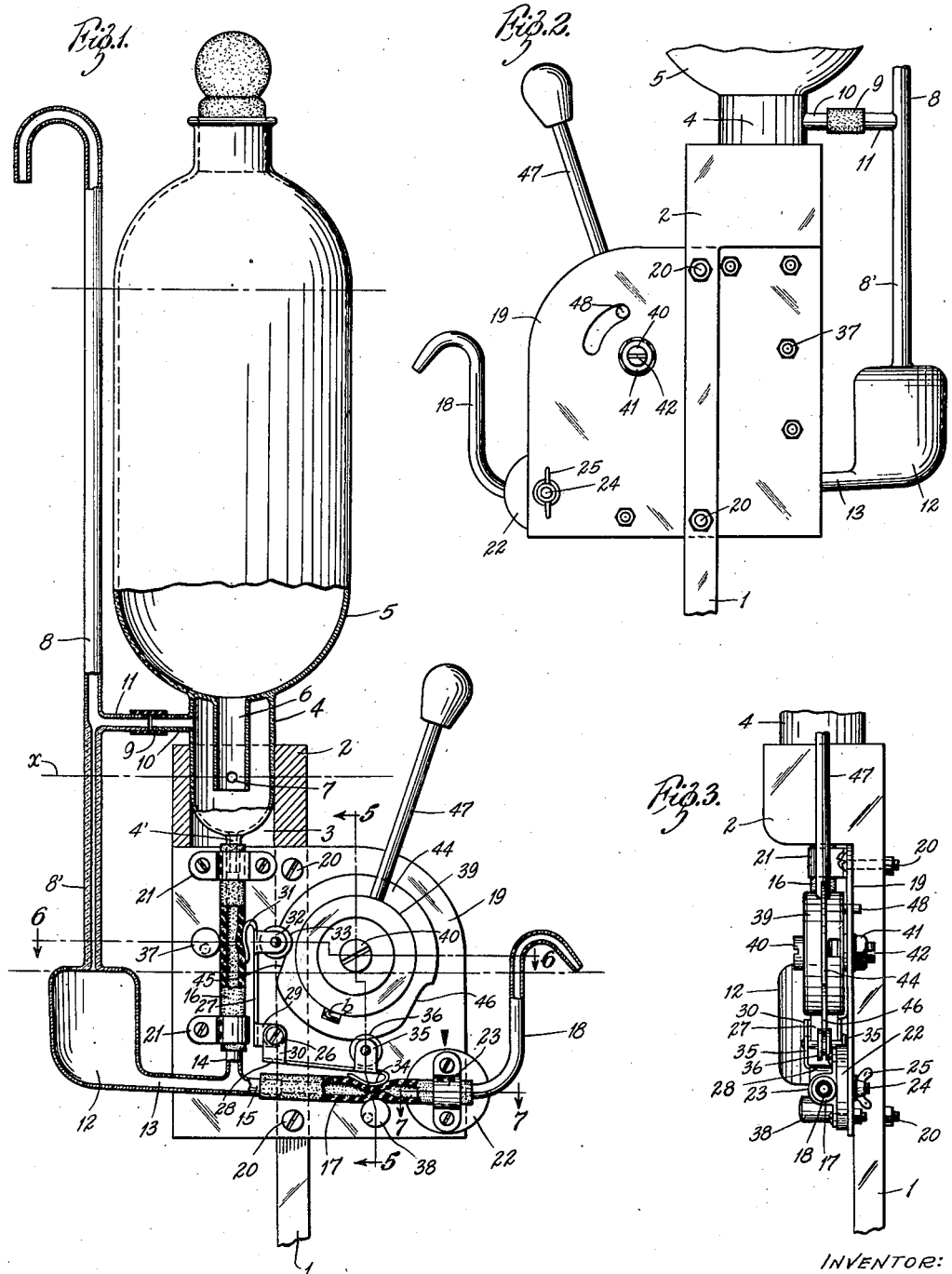
INVENTOR:
ROGER W. McBRIEN,
BY Harry L. Benner
ATTORNEY.

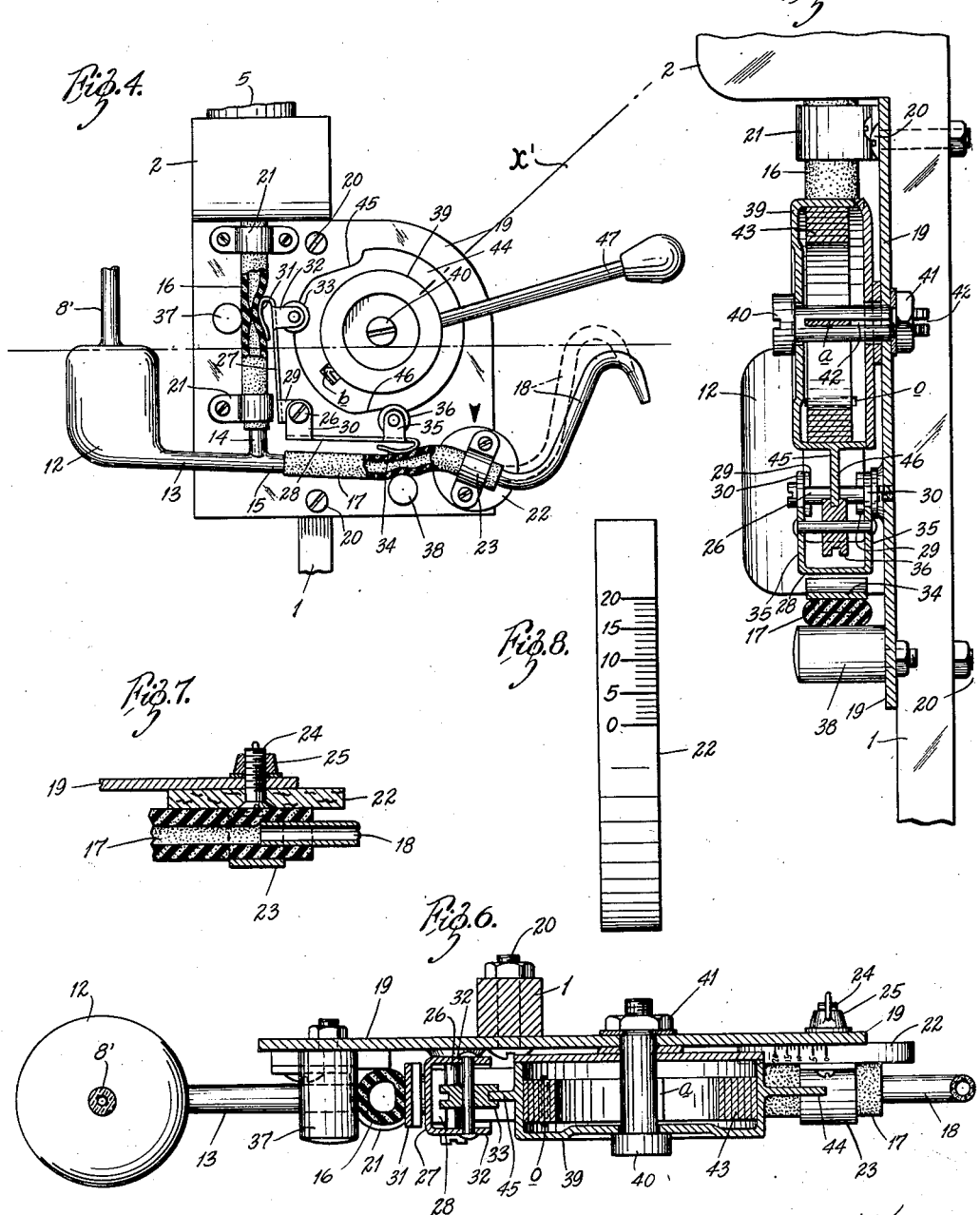

Oct. 30, 1945.　　　R. W. McBRIEN　　　2,387,922
APPARATUS FOR MEASURING LIQUIDS
Filed Nov. 23, 1942　　　3 Sheets-Sheet 3
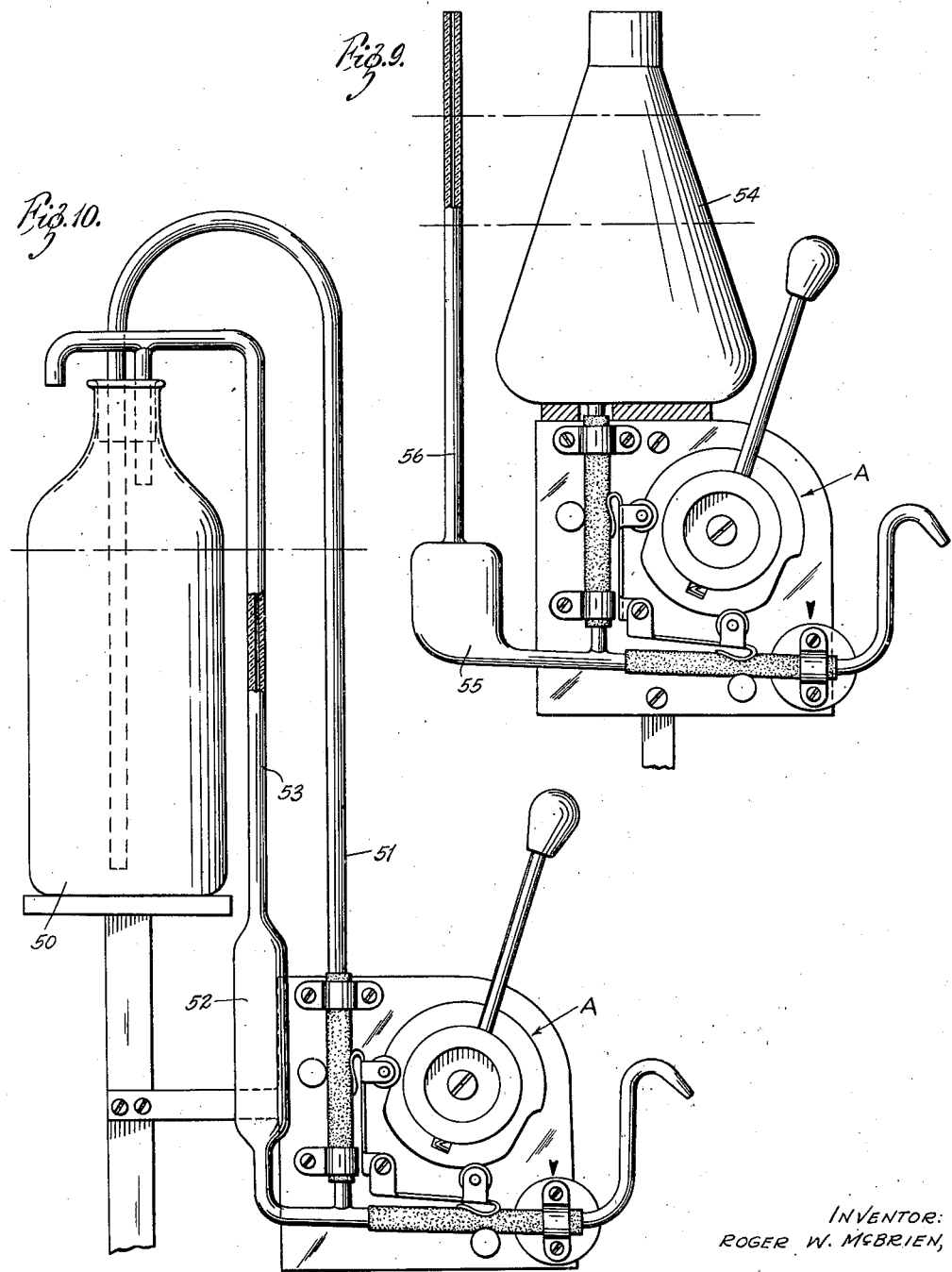

Patented Oct. 30, 1945

2,387,922

UNITED STATES PATENT OFFICE 2,387,922

APPARATUS FOR MEASURING LIQUIDS

Roger W. McBrien, Alton, Ill.

Application November 23, 1942, Serial No. 466,701

11 Claims. (Cl. 222—445)

My invention has relation to improvements in apparatus for measuring liquids for use in chemical laboratory work and it consists in the novel features of construction more fully set forth in the specification and pointed out in the claims.

More specifically the invention is a cam controlled pipette in that a cam controls the flow of liquid from the container to the pipette and the discharge of the liquid, in measured amount, from the pipette. This two-fold control of the liquid with but a single control lever is the principal object of the invention as it facilitates the operators work where numerous tests are run in which a like amount of reagent is used.

A further object of the invention is to provide means whereby the amount of the liquid discharged from the pipette may be varied in quantity from zero to maximum and fixed at any predetermined amount within its range.

A further object is to provide for the discharge of measured quantities of liquid by means which is extremely simple in construction and yet capable of performing the measuring function with the high degree of accuracy necessary in laboratory work.

These advantages will be better apparent from a detailed description of the invention in connection with the accompanying drawings, in which:

Figure 1 is a side elevation of my improved pipette with parts broken away; Fig. 2 is an elevation of the apparatus from the side opposite that shown in Fig. 1 with upper and lower parts broken away; Fig. 3 is a front elevation or edge view of the apparatus with parts broken away; Fig. 4 is a side elevation of the control mechanism but with the cam operating lever moved to open position and the discharge spout lowered in order to discharge a measured amount of liquid from the pipette; Fig. 5 is a vertical section taken on the line 5—5 of Fig. 1; Fig. 6 is a horizontal longitudinal section taken on the line 6—6 of Fig. 1; Fig. 7 is a cross-sectional detail taken on the line 7—7 of Fig. 1; Fig. 8 is an edge view of the graduated dial on which the discharge spout of the pipette is mounted; Figs. 9 and 10 are elevational views of two slightly different forms of apparatus embodying my improved cam controlled pipette.

Referring to the drawings (Figs. 1 to 8 inc.) 1 represents a supporting standard (with the lower part broken away) at the upper end of which is a head 2 having a bore 3 for receiving the tubular extremity 4 of a container 5. The extremity 4 constitutes the well of a constant level device of the barometric type, and the container discharges into the well through the medium of a neck 6 preferably formed integral with the container and perforated at 7 to determine the level to which the liquid will rise in capillary tube 8 which is connected to the well 4 by a tubular coupling 9 between branches 10 and 11 leading from the well 4 and tube 8. The well 4 is sealed to or integral with the container to avoid contamination by exposure of liquid in the well or evaporation therefrom. The lower part 8' of tube 8 leads into a measuring receptacle 12 which in turn has a combination outlet and inlet tube 13 terminating in branches 14 and 15.

Branch 14 is connected to the well 4 by a rubber tube 16 attached to the well through the medium of a reduced terminal 4'. Branch 14 serves as the inlet for receptacle 12, while branch 15 is connected by a rubber tube 17 to the discharge spout or gooseneck 18 and serves as the outlet from receptacle 12.

A plate 19 is secured by bolts 20 to standard 1 and the tube 16 is held to the plate by clamps 21.

The outer end of the rubber tube 17 carries the gooseneck 18 and is secured to a disk 22 by a clamp 23, said disk being rotatably mounted on plate 19 by means of a bolt 24 and wingnut 25.

Mounted for rotation on a stud 26 secured to plate 19 within the angle formed by the tubes 16 and 17 are two levers 27 and 28, which have spaced ears 29, 29, and 30, 30 respectively on their inner ends to receive the stud 26. The lever 27 extends upwardly and terminates in an outwardly bent extremity 31 for engagement with tube 16 opposite to which are ears 32, 32 between which a grooved roller 33 is mounted.

The lever 28 extends laterally and terminates in an outwardly bent extremity 34 for engagement with tube 17 opposite to which are ears 35, 35 between which a groove roller 36 is mounted. Studs 37 and 38 are mounted on the plate 19 adjacent to tubes 16 and 17 respectively and in line with the ends 31 and 34 of the respective levers 27 and 28. It will be seen that the levers 27 and 28, respectively, cooperate with the studs 37 and 38 to form valve means or cut off devices of the pinchcock type controlling the flow of fluid in the tubes 16 and 17.

A cylindrical spring housing 39 is mounted for rotation on a stud 40 securely held in place by a nut 41, said stud having a slot 42 to receive one end $a$ of a coiled spring 43 while the other end $b$ of said spring is held in an opening $o$ in the wall of housing 39. A flange 44 is formed on the periphery of housing 39 and has cam surfaces 45 and 46 spaced so that the former will be effective on roller 33 and the latter on roller 34 whereby levers 27 and 28 are alternately rocked to close and open the passage through the tubing 16 and 17. In other words the levers 27 and 28 operate as valves to control the flow of fluid through the tube 16 into receptacle 12 and through tube 17 to discharge spout 18.

An operating handle 47 projects from the periphery of housing 39 whereby said housing may be rotated against the tension of spring 43, the limits of rotation being fixed by a pin 48 projecting from the rear of housing 39 through an arcuate slot M in plate 19.

The cam surfaces 45 and 46 are so spaced that when the passage through tube 16 is free the tube 17 is pinched off (see Fig. 1) and when passage through tube 17 is free tube 16 is pinched off (see Fig. 4). However there is a point about midway between these two extremes when both tubes 17 and 18 are pinched off (dotted line $x'$ Fig. 4).

The amount of fluid discharged from the spout 18 is determined by the position of the spout. When its orifice is on the level with the top of container 12 then only the negligible quantity in the capillary tube 8 is discharged by actuating the handle 47, and when the spout is in its lowermost position the maximum amount is discharged. The position of the spout is adjusted by rotating disk 22 which has graduations on its periphery indicating the volume in c. c. for any position of the spout from minimum to maximum (Fig. 8).

In the operation of my invention the container 5 is supplied with the titration fluid and tightly stoppered. Then fluid is drawn from spout 18 by the operation of handle 47 until the surplus has been drawn from the pipette down to the level of line $x$ (Fig. 1).

The spout 18 is now set in proper position for the amount of fluid required by the tests. This amount is indicated by the graduated disc 22. By now actuating handle 47 to the position shown in Fig. 4 the required amount of fluid will discharge from the receptacle 12. When handle 47 is released fluid will flow from extremity 4 of container 5 through tube 16 into receptacle 12 until the level in pipette tube 8 is again at the line $x$. The opening 7 in neck 6 determines this level according to the laws of physics.

The rotation of housing 39 alternately operates levers 27 and 28 which act as valves controlling the flow of fluid through tubes 16 and 17.

In the modification Fig. 10 the valve actuating mechanism A is similar to that of the main form, but a somewhat different container 50 is used. The liquid is syphoned from container 50 by a tube 51 and receptacle 52 is connected to container 50 by a tube 53.

In modification Fig. 9, the fluid is fed to the valve actuating mechanism by gravity from a container 54. Receptacle 55 has a capillary tube 56 extending upwardly to the top level of container 54.

Having described my invention, I claim:

1. An apparatus for measuring liquids comprising a container sealed from atmospheric pressure, a well in which the lower end of said container is disposed, a receptacle connected with the bottom of said well and having a vent tube connected with the upper part of said well, a tube connecting the lower part of the receptacle with the bottom of the well, a discharge spout for the receptacle, a tube connecting the lower part of the receptacle with the discharge spout, means for moving said spout in a vertical plane to control the quantity of fluid discharged from the receptacle, means for closing the passages through the two last mentioned tubes, and cams effective on said closure means whereby one tube may be opened while the other is being closed.

2. A measuring and dispensing pipette comprising, in combination, a receptacle of glass or the like having a lower outlet and a vertically projecting vent tube at its upper end, a well disposed above the receptacle at one side of said tube, a connection between the well and the receptacle including a flexibly resilient tube of rubber or the like, a discharge tube connected with the outlet of the receptacle and also made of rubber or the like, said flexible tubes being disposed substantially at right angles to each other, a pinchcock for each of said tubes, and a rotary cam disposed in the angle formed by the tubes and operatively associated with both of said pinchcocks, said cam being operative to open one of said pinchcocks while closing the other.

3. A measuring and dispensing pipette comprising, in combination, a receptacle of glass or the like having a lower outlet and a vertically projecting vent tube at the upper end, a well disposed above the receptacle at one side of said tube, a connection between the well and the receptacle, a discharge tube connected with the outlet of the receptacle, said connections being disposed substantially at right angles to each other, and means including a cam disposed in said angle and operative to open one of said connections while closing the other.

4. A measuring and dispensing pipette comprising, in combination with a receptacle, means including a flexible tubular connection for supplying a predetermined quantity of liquid to the receptacle, a flexible tubular outlet connection for the receptacle, and means controlling said connections comprising a single rotary cam member and cut off means including pinchcocks actuated by said cam member successively.

5. A measuring device of the character set forth comprising, in combination with a measuring receptacle, a container for liquid to be dispensed, having a connection with said receptacle, an outlet connection for said receptacle, each of said connections including a flexible tube of rubber or the like, a pinchcock for each of said tubes each having a roller follower, and a cam disk operative upon said followers to positively close said pinchcocks in different rotative positions of the cam.

6. In a measuring pipette of the character set forth, the combination of a receptacle having an outlet including a flexible tube of rubber or the like, a liquid container having a connection with the receptacle and also including a flexible tube, a pinchcock associated with each of said tubes, a rotary cam disk having peripherally spaced notches with an intervening arcuate cam lobe, each of said pinchcocks including a movable clamping member and a roller follower thereon arranged for coaction with said cam disk, and means for rotating said cam disk.

7. In a measuring pipette of the character set forth, the combination of a receptacle having an outlet connection, a liquid container, a well into which said container discharges having a supply connection with the lower portion of the receptacle, a connection between the upper end of the receptacle and said well, certain of said connections including a resiliently flexible tube, and means controlling said connections including a rotary cam disk and a pinchcock including a movable clamping member and a roller follower arranged for coaction with said cam disk, and means for rotating said cam disk.

8. In a liquid measuring pipette of the character set forth, the combination of a receptacle having an outlet including a flexible tube of rubber or the like and a discharge spout hinged on said flexible tube and adjustable to various calibrated angular positions with respect to said receptacle to preselect a measured quantity of liquid to be dispensed from the receptacle, a liquid container having a connection with the receptacle which also includes a flexible tube, a pinchcock associated with each of said tubes, cam followers on said pinchcocks, and a manually operable cam adapted to separately operate said pinchcocks in predetermined sequence.

9. In a liquid measuring pipette of the character set forth, the combination of a receptacle having an outlet including a flexible tube of rubber or the like and a discharge spout hinged on said flexible tube and adjustable to various calibrated angular positions with respect to said receptacle to preselect a measured quantity of liquid to be dispensed from the receptacle, and means holding said spout in the position to which it is adjusted.

10. In a liquid measuring pipette of the character described, the combination of a liquid container, a constant level well into which the container discharges, a measuring receptacle connected to said constant level well at a point below the normal liquid level in the well and adapted to receive liquid through said connection to a level determined by that in the constant level well, said measuring receptacle having a portion of relatively large diameter disposed below the normal liquid level in the well and having a tube with a very small restricted bore extending upwardly therefrom to a level above the normal liquid level in the well so as to minimize possible errors in measured quantities of liquid in the measuring receptacle and tube due to variations of level in the constant level well or failure to exactly level the apparatus, and restricted vent means for admitting air to said well and said receptacle, said well being sealed against the admission of air except by way of said vent means.

11. A liquid measuring and dispensing device having, in combination, a container sealed from atmospheric pressure, an outlet tube extending from the lower end of said container, a constant level well sealed to said container enclosing said outlet tube and adapted to receive liquid discharged from the container through the tube, a measuring receptacle having a portion of relatively large capacity disposed below the normal liquid level in said well, means providing a connection from said receptacle to said well at a point below the normal liquid level therein for filling the receptacle from the well, means providing a restricted passage for venting the upper end of said receptacle and also said well to the atmosphere, a tube connecting with the upper end of said receptacle having a restricted bore extending upwardly to a level above the normal liquid level in said well, said restricted bore forming part of said venting means and serving to minimize errors in the filling of said receptacle due to variations in the level of the liquid in said well or failure to exactly level the device, an outlet from said receptacle, and manually operable means for selectively controlling said filling connection and said outlet.

ROGER W. McBRIEN.